United States Patent
Joachimsthaler et al.

(10) Patent No.: US 11,874,107 B2
(45) Date of Patent: Jan. 16, 2024

(54) DEVICE AND METHOD FOR PROCESSING ROTATION-DEPENDENT MEASURED VALUES

(71) Applicant: DR. JOHANNES HEIDENHAIN GmbH, Traunreut (DE)

(72) Inventors: Ingo Joachimsthaler, Traunstein (DE); Sebastian Schmidt, Fridolfing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 10 days.

(21) Appl. No.: 17/467,939

(22) Filed: Sep. 7, 2021

(65) Prior Publication Data
US 2022/0074740 A1 Mar. 10, 2022

(30) Foreign Application Priority Data
Sep. 7, 2020 (DE) .......................... 102020211215.0

(51) Int. Cl.
*G01B 21/22* (2006.01)
*G01D 9/32* (2006.01)

(52) U.S. Cl.
CPC .............. *G01B 21/22* (2013.01); *G01D 9/32* (2013.01)

(58) Field of Classification Search
CPC .......... G01B 21/22; G01D 9/28; G01D 21/02; G05B 19/39; G05B 2219/33249; G05B 2219/37; G05B 2219/37104; G05B 2219/37154; G05B 2219/37155; G05B 2219/37263; G05B 2219/37525; G05B 19/408; G05B 19/4086; H02P 6/16; G01M 13/00; G01M 13/028; G01M 13/045

See application file for complete search history.

(56) References Cited

U.S. PATENT DOCUMENTS

| | | | |
|---|---|---|---|
| 6,026,348 A * | 2/2000 | Hala | G01H 1/003 |
| | | | 702/56 |
| 7,401,005 B2 | 7/2008 | Heinemann | |
| 9,864,362 B2 | 1/2018 | Wunderlich et al. | |
| 10,378,991 B2 * | 8/2019 | Joachimsthaler | G01M 1/36 |
| 2003/0179104 A1 * | 9/2003 | Hermary | G05B 19/408 |
| | | | 340/870.16 |
| 2010/0063775 A1 * | 3/2010 | Colling | G01M 15/00 |
| | | | 702/182 |

FOREIGN PATENT DOCUMENTS

DE 10200682 A1 7/2003
EP 2924526 A1 9/2015

* cited by examiner

*Primary Examiner* — Son T Le
*Assistant Examiner* — Matthew W. Baca
(74) *Attorney, Agent, or Firm* — CARTER, DELUCA & FARRELL LLP (57) ABSTRACT

A device for processing rotation-dependent measured values includes a data converter, a sequencing control, and an output interface. Series of measured values, which are a function of the rotation of a shaft and of which at least one is an angle value that indicates the angular position of the shaft, are conveyable to the data converter at constant time intervals of a measuring interval. The data converter is adapted to subdivide a rotation of the shaft into sectors and, using one of the angle values as a reference angle value, to allocate received measured values to a sector, and per rotation of the shaft, to ascertain for each series of measured values precisely one result value for each sector. The result values are able to be output to the output interface.

29 Claims, 8 Drawing Sheets

DEVICE AND METHOD FOR PROCESSING ROTATION-DEPENDENT MEASURED VALUES

CROSS-REFERENCE TO RELATED APPLICATIONS

The present application claims priority to Application No. 10 2020 211 215.0, filed in the Federal Republic of Germany on Sep. 7, 2020, which is expressly incorporated herein in its entirety by reference thereto.

FIELD OF THE INVENTION

The present invention relates to devices and methods for processing rotation-dependent measured values.

BACKGROUND INFORMATION

In the field of automation technology, many movement sequences are based on rotating shafts which are driven by electric motors either directly or indirectly. Rotating shafts are able to influence machine components even without any external force application, for example, by causing mechanical vibrations due to a rotating unbalance. If external forces act on the shaft in addition, such effects are amplified many times over, in particular, when resonant frequencies of machine components are involved.

A particularly sensitive technical field in this context is the highly precise machining of workpieces in machine tools. In this regard, the motor spindle is a critical component because it includes a shaft that is operated at different rotational speeds and that, depending on the machining step, is subjected to the application of high lateral and dynamically variable forces.

Taking milling processing as an example, the machining results in forces during the operation that are affected by the feed rate and also by the number and the state of the blades of the employed milling tool. These induce dynamic bending of the shaft, which may have a wide variety of negative effects on the machine tool.

Different sensors, such as acceleration sensors or structure-borne noise sensors for acquiring vibrations, are used in order to be able to analyze such effects, or strain gauges for detecting distortions.

European Patent Document No. 2 924 526 describes a method for monitoring operating parameters of machine tools. For this purpose, sensors are used to perform measurements at constant time intervals and the measured values are represented in the form of graphics. This method has the disadvantage that a great number of measured values are measured per rotation of the shaft, in particular, at low rotational speeds, and the evaluation is consequently very expensive in terms of memory and computing resources.

SUMMARY

Example embodiments of the present invention provide a device which supplies result data that allow for an uncomplicated analysis of the effect of a rotating shaft on machine components.

According to an example embodiment of the present invention, a device for processing rotation-dependent measured values is provided and includes a data converter, a sequencing control, and an output interface. Series of measured values, which are a function of the rotation of a shaft and of which at least one is an angle value that indicates the angular position of the shaft, are conveyable to the data converter at constant time intervals of a measuring interval. The data converter is adapted to: subdivide a rotation of the shaft into n sectors; using one of the angle values as a reference angle value, allocate received measured values to a sector; and, per rotation of the shaft, ascertain for each series of measured values precisely one result value for each sector. The result values can be output to the output interface.

In addition, example embodiments of the present invention provide a method for obtaining result data that allow for an uncomplicated evaluation of the influence of a rotating shaft on machine components.

According to an example embodiment of the present invention, a method is provided for operating a device for processing rotation-dependent measured values, the device including a data converter, a sequencing control, and an output interface. Series of measured values, which are a function of the rotation of a shaft and of which at least one is an angle value that indicates the angular position of the shaft, are conveyed to the data converter at constant time intervals of a measuring interval. A rotation of the shaft is subdivided in the data converter into n sectors. Using one of the angle values as a reference angle value, received measured values are allocated to a sector and, per rotation of the shaft, precisely one result value is ascertained for each sector for each series of measured values. The result values are output to the output interface.

Further features and aspects of example embodiments of the present invention are described in more detail below with reference to the appended schematic Figures.

DETAILED DESCRIPTION

The same reference numerals are used throughout the following description and Figures to designate the same or similar components.

Figure 1:
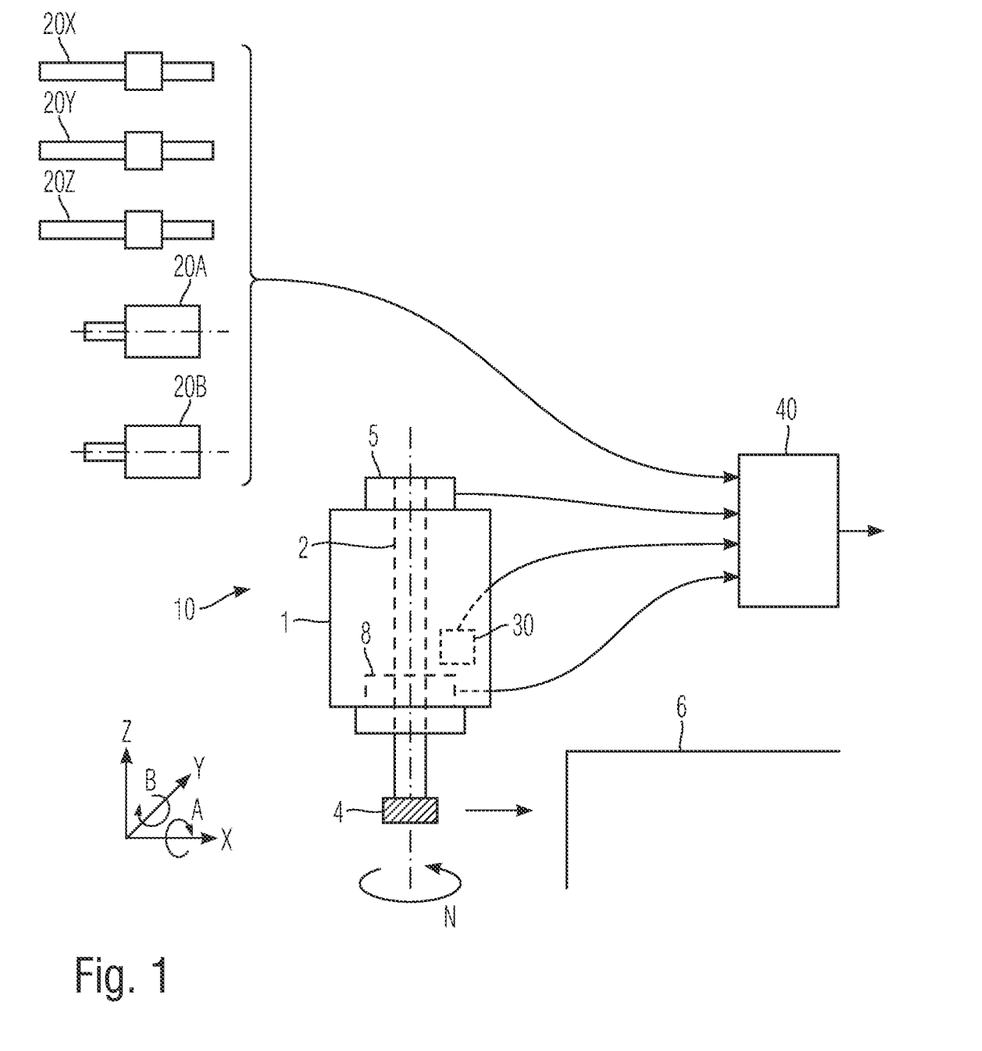
FIG. 1 schematically illustrates a machine tool having a motor spindle.

FIG. 1 schematically illustrates, in simplified form, a machine tool having a motor spindle 10. The central component is a spindle motor 1 having a shaft 2. A tool 4, such as a milling tool, is arranged at one end of shaft 2. A tool holder, e.g., a collet chuck or a hollow shaft taper, is provided for fastening tool 4 to shaft 2. Also mechanically coupled with shaft 2 is an angle measuring device 5, or rotary encoder. The coupling is implemented via a mechanical coupling, which connects a rotatable shaft of angle measuring device 5 to shaft 2. This makes it possible to measure the angular position and/or the number of completed rotations of shaft 2 with the aid of angle measuring device 5. The support of shaft 2 in the housing of spindle motor 1 is obtained using rolling bearings.

During the machining of a workpiece 6, shaft 2 rotates at a variable rotational speed N, and by a relative motion of motor spindle 10 in relation to workpiece 6, tool 4 is brought into contact therewith. The desired contour, for example, is milled out of workpiece 6 during the milling operation. The relative motion may take place along linear drive axes X, Y, Z, but it also possible to additionally provide pivot axes A, B, so that a motion in five movement axes, or degrees of freedom, X, Y, Z, A, B is possible in the illustrated example embodiment. The movement of the individual axles is controlled via servo drives, which in turn drive corresponding mechanical components. Further position measuring devices 20X, 20Y, 20Z, 20B are provided in the machine tool in order to determine the position of respective movement axes X, Y Z, A, B.

In addition, a multi-position measuring device 8 may be provided in motor spindle 10, whose configuration and operation are described in more detail below with reference to FIG. 7.

The rotation of shaft 2 may have various effects on the operation of the machine tool. Even without contact between tool 4 and workpiece 6, vibrations may occur as a function of the rotational speed on account of an imbalance of the shaft, bearing play of the rolling bearings, eccentricity errors, etc. Because of the forces acting on tool 4 during the machining of workpiece 6, even more serious effects on the machine tool can manifest themselves, frequently also in the form of mechanical vibrations.

Moreover, a sensor 30 by which further machine states are measurable is provided in motor spindle 10. This may include an acceleration sensor, a vibration sensor, a structure-borne noise sensor, strain gauges, a measuring resistor for a current measurement, and others. The measured values of angle measuring device 5, of position measuring devices 20X, 20Y, 20Z, 20A, 20B, multi-position measuring device 8 and of sensor are transmittable to a control unit 40 via suitable cables. Control unit 40 has interfaces for the connection of the cables and is used for the acquisition and processing of the measured values.

Figure 2:
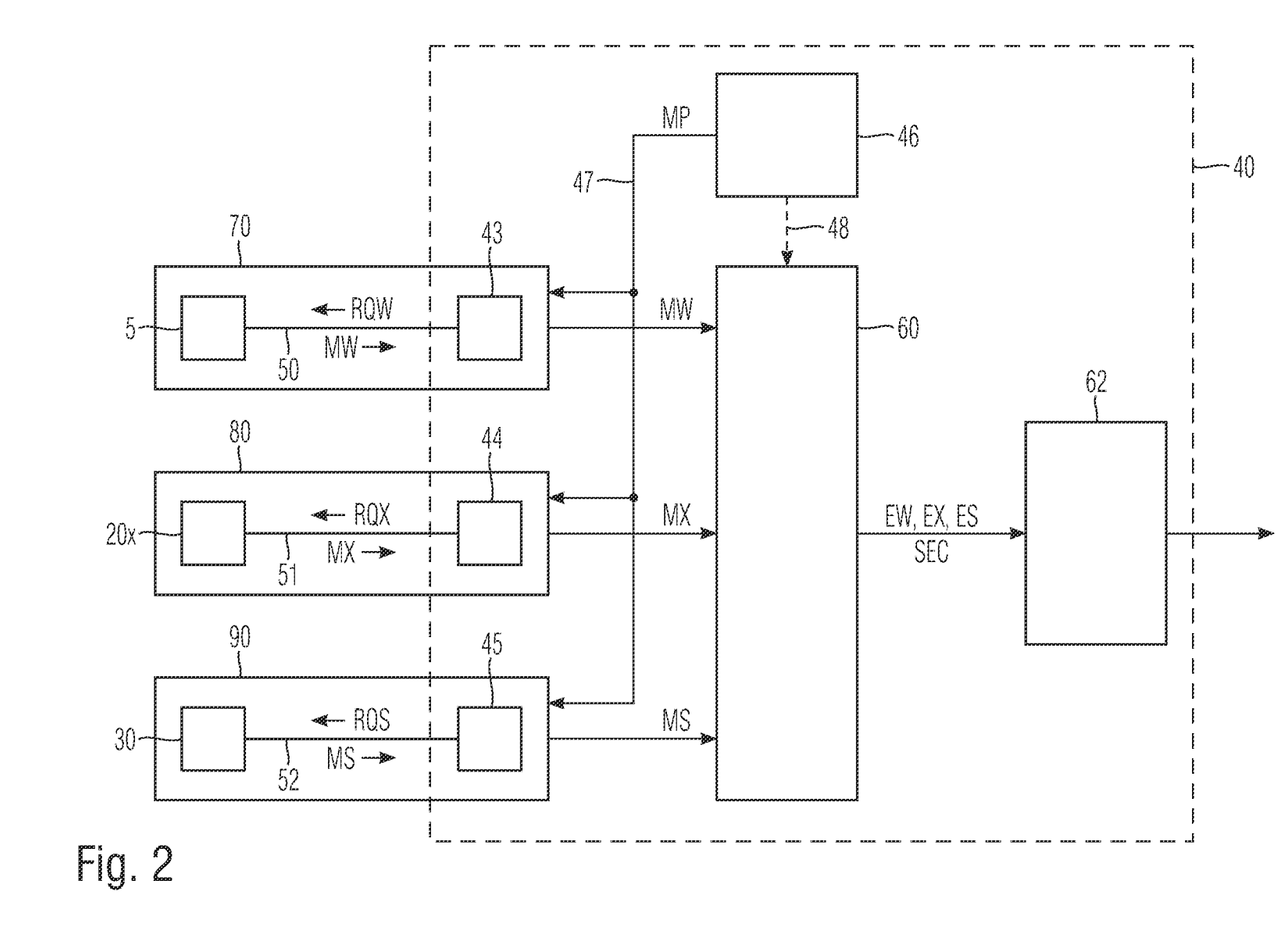
FIG. 2 schematically illustrates a device according to an example embodiment of the present invention.

Based on the machine architecture illustrated in FIG. 1, FIG. 2 schematically illustrates a device according to an example embodiment of the present invention.

A core function of the device is the processing of series of rotation-dependent measured values. These are measured values that may be affected by the rotation of shaft 2. In addition to readily apparent effects, such as the change in the angular position of shaft 2 itself, these are, for example, measured values that are produced by forces generated by rotating shaft 2 itself or which are acting on shaft 2 while the machine is in operation. Various measuring systems are provided for measuring and supplying measured values. A first measuring system 70 is adapted to measuring the angular position of shaft 2. It includes angle measuring device 5, a data transmission channel 50, and a data interface 43. In addition, two further measuring systems 80, 90 are provided, e.g., a second measuring system 80, which, as a substitute for position measuring devices 20X, 20Y, 20Z, 20A, 20B illustrated in FIG. 1, includes the position measuring device 20X for measuring movements in the direction of movement axis X, and a third measuring system 90 having sensor 30, which may be arranged as a digital sensor, as a measuring device. Each of second measuring system 80 and third measuring system 90 has a respective data transmission channel 51, 52 and a respective data interface 44, 45.

The particular configuration of position measuring device should not be considered to be restrictive. It should be understood that each position measuring device 20X, 20Y, 20Z, 20B to be examined with regard to the influence of rotating shaft 2 may be used as a measuring unit in a further measuring system.

A measuring system within the present context includes the necessary components for performing measurements triggered by an external signal and for digitally supplying or outputting ascertained measured values. The configuration in each case includes at least one measuring device, a transmission channel, and an interface. Using the at least one measuring device, at least one measured variable is able to be acquired and supplied via the transmission channel to the interface in the form of digital measured values and/or measuring signals to be evaluated, depending on the configuration and arrangement of the measuring device.

In first measuring system 70, the angular position of shaft 2 is measurable with the aid of angle measuring device 5. It is arranged as an absolute angle measuring device, for example. The initiation of an angle measurement is obtained by transmitting a request command RQW from data interface 43 via data transmission channel 50 to angle measuring device 5. The transmission of resulting angle value MW in the opposite direction takes place from angle measuring device 5 via data transmission channel 50 to data interface 43.

In a similar manner, a position value MX is measurable in second measuring system 80 with the aid of position measuring device 20X and transmittable via data transmission channel 51 to data interface 44. The measurement is initiated by a request command RQX.

Sensor 30 in third measuring system 90 is arranged as a digital sensor, and a measurement is therefore also performed in response to the receipt of a request command RQS, the transmission to data interface 45 taking place via data transmission channel 52.

Control unit 40 includes a sequencing control 46, a data converter 60, and an output interface 62. In addition, data interfaces 43 to 45 of measuring systems 70, 80, 90 are part of control unit 40.

In the illustrated example, all data interfaces are configured for a point-to-point data transmission, or in other words, data interfaces 43 to 45 communicate via corresponding data transmission channels 50 to 52 with connected digital measuring devices (e.g., angle measuring device 5, position measuring system 20X, and sensor 30).

Sequencing control 46 generates measuring pulses MP at constant time intervals and conveys them via a signal line 47 to measuring systems 70, 80, 90. By sending request commands RQW, RQX, RQS to angle measuring device 5, to position measuring device 20X, and to sensor 30, data interfaces 43 to request measured values via data interfaces 43, 44, 45. Measured values MW, MX, MS, which arrive in response to request commands RQW, RQX, RQS at respective data interfaces 43, 44, 45, are conveyed to data converter 60. This procedure produces series of measured values in which individual measured values MW, MX, MS of measuring systems 70, 80, 90 are measured at the same time for the most part. Measured values MW, MX, MS are thus time-based.

It should be understood that there is no requirement to use the same data interfaces. Instead, all data interfaces supporting request commands are suitable, and a request command may be represented by any signal or any signal sequence. The medium from which data transmission channel 50, 51, 52 is formed may also be any type of medium. For example, the medium may include electrical lines, waveguides, or a wireless connection. In the case of electrical lines, the signal transmission may be a differential signal transmission, for example, according to the RS-485 standard. Accordingly, a line pair may be provided for a bidirectionally-operated data channel and a further line pair for a clock signal channel, for example.

A conversion of the time-based measured values generated in measuring systems 70, 80, 90 into angle-based, virtual result values takes place in data converter 60. For this purpose, a rotation of shaft 2 is subdivided into a number of n sectors, and a virtual, angle-based measured value is determined for each of the n sectors. Measured value MW of measuring system 70 is used as a reference for the current angular position of shaft 2 on which the allocation of the respective current sector is based.

The result values are output to output interface 62 by which they are able to be output to a sequential electronics for the further evaluation. The result values are, for example, storable in output interface 62 so that the output may also take place at a later time.

In summary, control unit 40 forms a measuring module that has interfaces for the connection of measuring devices via suitable transmission channels, as well as processing device(s) for the processing of measured values into result values, and it has an output interface for their output. Control unit 40 may be an autonomous device but may also be arranged as a measuring module in a machine control.

Figure 3:
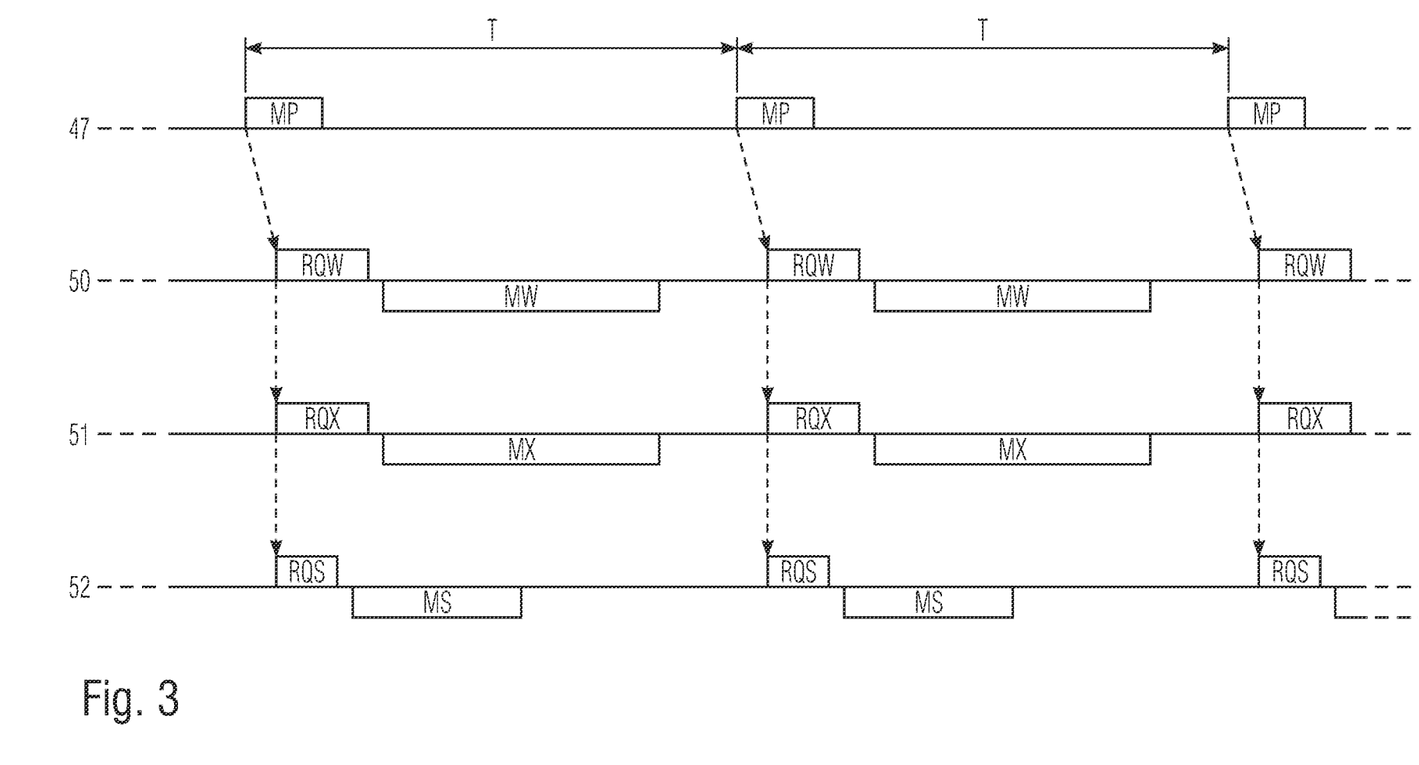
FIG. 3 is a signal diagram pertaining to the device illustrated in FIG. 2.

FIG. 3 is a signal diagram pertaining to the device illustrated in FIG. 2.

The uppermost line of the signal diagram includes measuring pulses MP, which sequencing control 46 outputs at constant measuring intervals T via signal line 47 to measuring systems 70, 80, 90. The arrival of a measuring pulse MP is able to be detected by monitoring a signal property, e.g., the arrival of a defined signal edge or a change in the signal level.

The following lines illustrate the communication within measuring systems 70, 80, 90 via data transmission channels 50 to 52 that follows in response to the arrival of measuring pulses MP. For example, signals in the direction toward angle measuring device 5, position measuring device 20X, and sensor are illustrated in the region above the zero line, while signals in the direction toward data interfaces 43 to 45 are illustrated below the zero line. Neither a signal polarity nor the number of lines provided for the transmission is indicated.

When a measuring pulse MP arrives, data interfaces 43 to 45 transmit request commands RQW, RQX, RQS directly via data transmission channels 50 to 52 to the corresponding measuring devices, i.e., angle measuring device 5, position measuring device 20X, and sensor 30. In response, these also perform measurements, substantially at the same time, and generate measured values—an angle value MW, a position value MX, and a sensor value MS—which they transmit to data interfaces 43 to 45.

The type of request commands RQW, RQX, RQS is interface-specific. In certain data interfaces, request commands RQW, RQX, RQS are defined data words, e.g., command words, as illustrated in FIG. 3. In other data interfaces, the arrival of a signal edge is interpreted as a request command RQW, RQX, RQS.

Measuring systems 70, 80, 90 output measured values MW, MX, MS to data converter 60 for the further processing.

The ascertainment of result values based on received measured values MW, MX, MS is performed in data converter 60. Suitable and exemplary methods for this purpose are described below with reference to FIG. 4.

Figure 4:
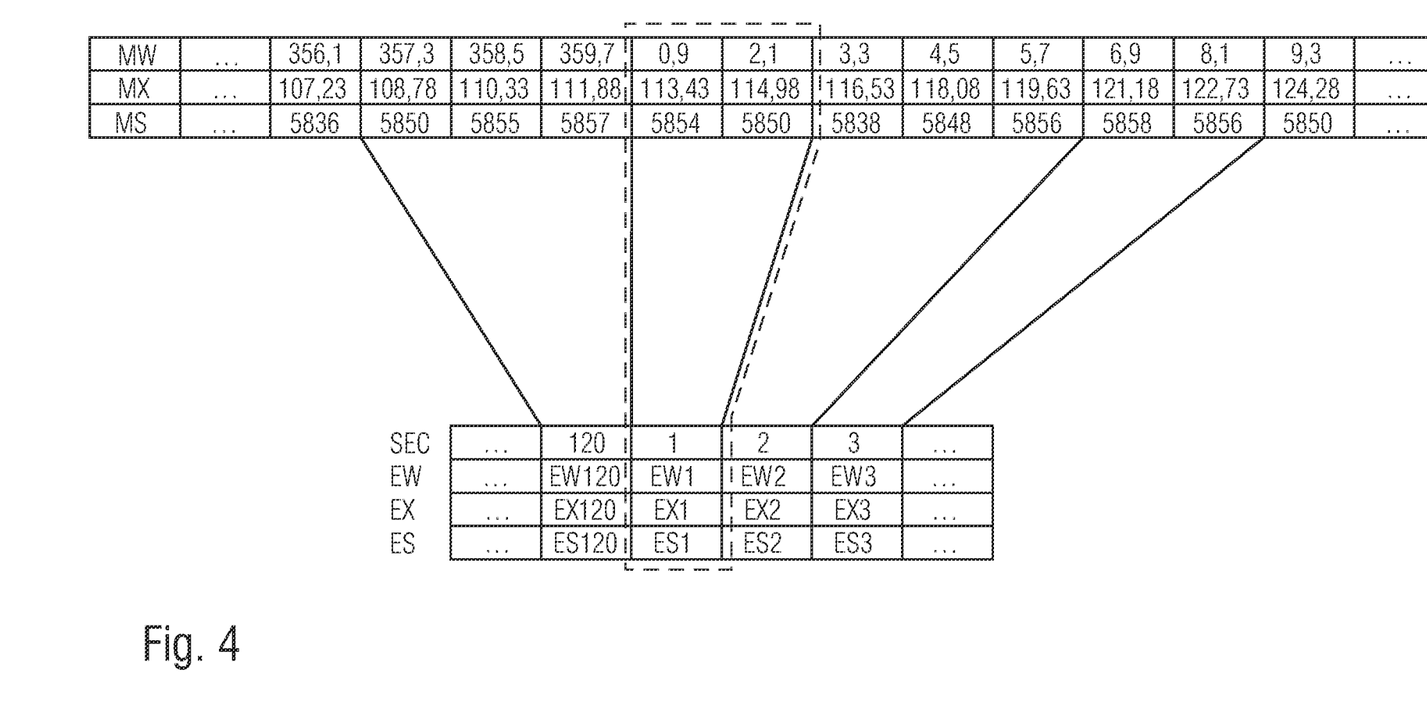
FIG. 4 includes value tables to illustrate methods according to example embodiments of the present invention.

FIG. 4 shows a first table, which includes consecutively-measured measured values MW, MX, MS, angle values MW being indicated in degrees)(°, position values MX being indicated in millimeters (mm), and sensor units MS are assumed to be unitless or dimensionless, e.g., whole numbers having a value range of 16 bits. In addition, FIG. 4 shows a second table which includes result values EW, EX, ES, which are ascertained by the data converter from the values of the first table.

It is assumed for the following description that a rotation of shaft 2 is subdivided into 120 equal sectors SEC. Each sector SEC thus includes an angular range of 3°. Which currently measured values MW, MX, MS are to be allocated to which particular sector SEC is determined by angle value MW, which serves as a reference angle value. For example, the angle values MW having table values 0.9° and 2.1° are allocated to sector 1, from which it also follows that position values MX having table values of 113.43 mm and 114.98 mm and sensor values MS having table values 5854 and 5850 are to be allocated to sector 1 as well because they are measured at the same time as corresponding angle values MW.

Data converter 60 ascertains at least one result value per sector SEC from the measuring sequence of one of measuring systems 70, 80, 90. Similar to the measured values (angle value MW, position value MX, sensor value MS), the result values bear the reference signs EW, EX and ES, supplemented by the sector number in each case.

The methods described below are considered particularly effective for ascertaining the result values.

A first method includes selecting as result value EW, EX, ES the first measured value after (or the last measured value before) a sector change. This method is particularly simple because it requires no calculation. Measuring interval T may be selected so that a multitude of measured values MW, MX, MS per sector SEC is measured during an ongoing operation. In the illustrated example, when selecting the first measured value after a sector change with a positive direction of rotation, for example, an angle result value EW1=0.9°, a position result value EX1=113.43 mm, and ES1=5854 for the sensor result value result for sector SEC=1.

In a second method, the average value is formed as result value EW, EX, ES from all measured values MW, MX, MS within a sector SEC. This method may be used when at least two measured values MW, MX, MS are measured per sector SEC. A particular advantage of this method is that low-pass filtering of measured values MW, MX, MS is achieved. For example, an angle result value EW1=1.5° is obtained for sector SEC=1, a position result value EX1=114.205 mm, and ES1=5852 for the sensor result value.

A third method is based on the calculation of a virtual measured value in relation to the angular position in the center of current sector SEC from at least two measured values MW, MX, MS within sector SEC as a result value EW, EX, ES. Suitable computation methods, for example, interpolation methods, such as a linear interpolation, polynomial interpolation, spline interpolation, etc., may be used for this purpose. This method reduces abrupt changes between result values EW, EX, ES, which are caused by the asynchronous measurement of measured values MW, MX, MS with regard to the rotary motion of shaft 2, e.g., jitter, and is therefore very precise. In a linear interpolation, an angle result value EW1=1.5° and a position result value EX1=114.205 mm result for sector SEC=1, for example, and ES1=5852 for the sensor result value, calculated for the sector center point at 1.5°.

In each method, the allocation of measured values MW, MX, MS to sectors SEC takes place based on the angle value MW as the reference angle value measured by measuring system 70.

The ascertained and provided result values EW, EX, ES are able to be output via output interface 62 to a sequential electronics for a further evaluation. Alternatively, output interface 62 may be arranged as a graphics interface to which a display device, such as a monitor, is able to be connected and on which the characteristic of result values EW, EX, ES is graphically displayable. For example, the characteristic of result values EW, EX, ES is able to be visually analyzed or assessed by an observer.

Figure 5A:
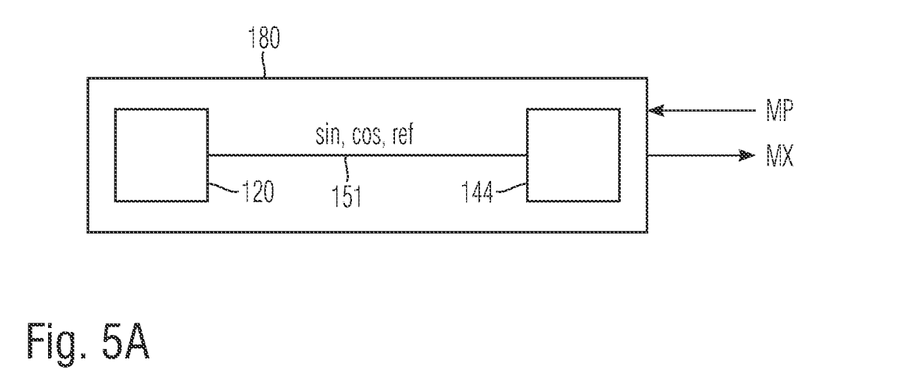
FIG. 5A schematically illustrates a measuring system of a device according to an example embodiment of the present invention.
Figure 5B:
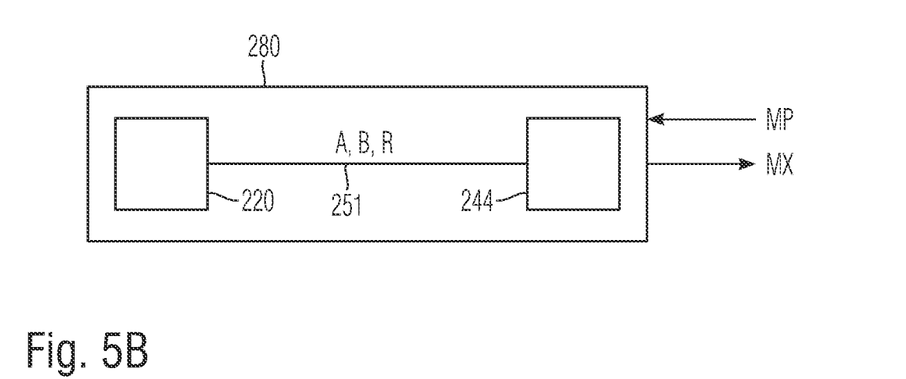
FIG. 5B schematically illustrates a measuring system of a device according to an example embodiment of the present invention.
Figure 5C:
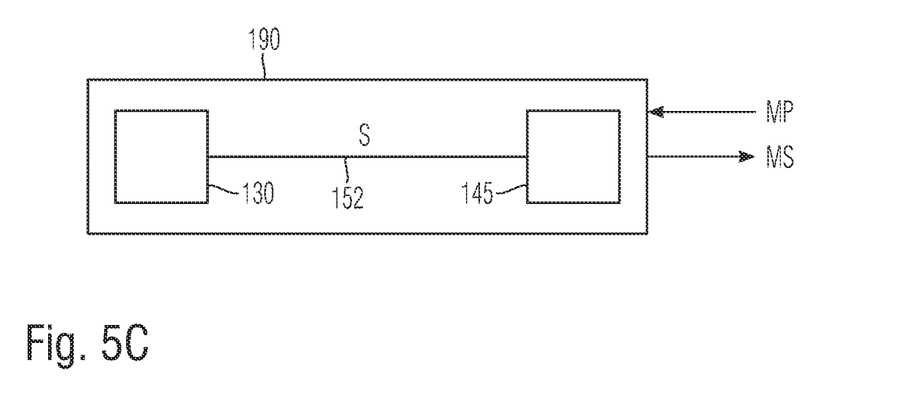
FIG. 5C schematically illustrates a measuring system of a device according to an example embodiment of the present invention.

FIGS. 5A to 5C schematically illustrate variants of a measuring system. The measuring systems illustrated in FIGS. 5A and 5B may replace measuring system 80 illustrated in FIG. 2, for example, and the measuring system illustrated in FIG. 5C may be used in place of measuring system 90.

Measuring system 180, which is illustrated in FIG. 5A, includes an incremental encoder 120 whose analog position signals sin, cos, ref are conveyed via a signal transmission channel 151 to a processing interface 144. Incremental encoder 120 may be arranged as an angle measuring device, e.g., rotary encoder, or as a linear measuring device.

Position signals sin, cos, ref of incremental encoder 120 are generated by scanning a regular graduation structure, according to conventional approaches. Given a constant rotational speed or traveling speed, position signals sin, cos are substantially sinusoidal and have a phase shift of 90° relative to one another. The number of graduation periods of the graduation structure corresponds to the number of signal periods of position signals sin, cos. Thus, a position determination is possible by evaluating position signals sin and cos in conjunction with position signal ref, which defines a reference position.

Processing interface 144 ascertains the current position value MX in relation to the reference position by evaluating, e.g., the signal periods and possibly fractions of the signal periods, e.g., interpolation, of position signals sin, cos.

If a measuring pulse MP is received, further measuring system 180 outputs current position value MX via processing interface 144.

Measuring system 280, which is illustrated in FIG. 5B, also includes an incremental encoder 220. In contrast to FIG. 5A, however, it outputs digital position signals A, B, R via a signal transmission channel 251 to a processing interface 244.

Position signals A, B are square-wave signals and phase-shifted by 90° relative to one another. Position signal R is used for determining the reference position and is likewise a square-wave signal, for example.

By counting the signal periods or signal edges of position signals A, B in relation to the reference position, processing interface 244 ascertains current position value MX.

Further measuring system 280 outputs current position value MX via processing interface 244 after a measuring pulse MP is received.

Further measuring system 190, illustrated in FIG. 5C, includes an analog sensor 130 whose analog sensor signal S is conveyed via a signal transmission channel 152 to a processing interface 145.

Analog sensor 130 may include any component or an electric circuit that converts a variable to be measured into an electrical signal. It may include variable resistors such as strain gauges, e.g., DMS transducers, or also constant measuring resistors, e.g., for measuring the motor current of spindle motor 1.

Processing interface 145 is adapted to generate and output sensor value MS from sensor signal S after receipt of measuring pulse MP. An A/D converter as well as a computing circuit may be provided for this purpose.

Figure 6A:
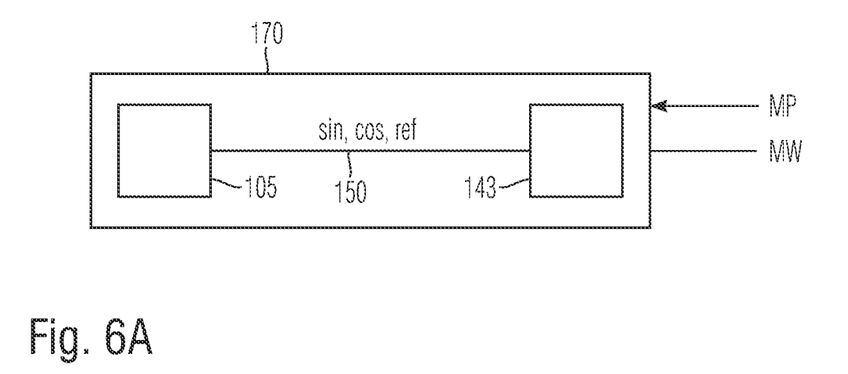
FIG. 6A schematically illustrates a measuring system of a device according to an example embodiment of the present invention.
Figure 6B:
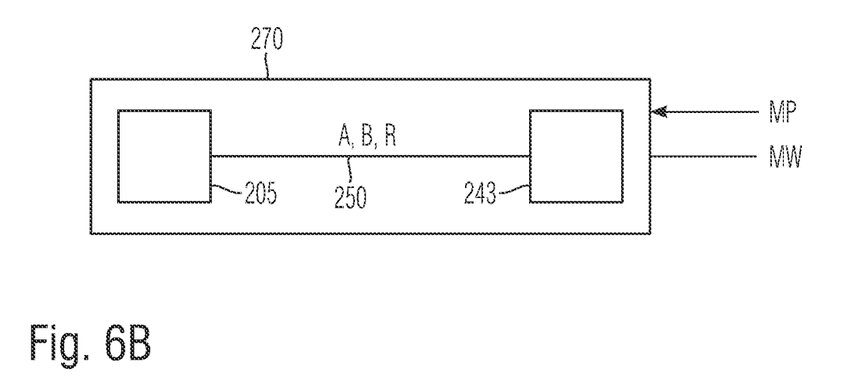
FIG. 6B schematically illustrates a measuring system of a device according to an example embodiment of the present invention.

FIGS. 6A and 6B schematically illustrated alternative variants of measuring systems, which may replace measuring system 70 illustrated in FIG. 2.

Measuring system 170 illustrated in FIG. 6A corresponds to measuring system 180 illustrated in FIG. 5A. However, because this measuring system is used for measuring the angular position of shaft 2, the measuring device is restricted to an incremental rotary encoder 105 whose analog position signals sin, cos, ref are conveyed via a signal transmission channel 150 to a processing interface 143. Similar to measuring system 70, measuring system 170 outputs an angle value MW in response to the arrival of a measuring pulse MP.

In comparison with that illustrated in FIG. 6A and similar to that illustrated in FIG. 5B, measuring system 270 includes an incremental rotary encoder 205, which outputs digital position signals A, B, R via a signal transmission channel 250 to a processing interface 243. The arrival of a measuring pulse MP causes the output of an angle value MW.

Figure 7:
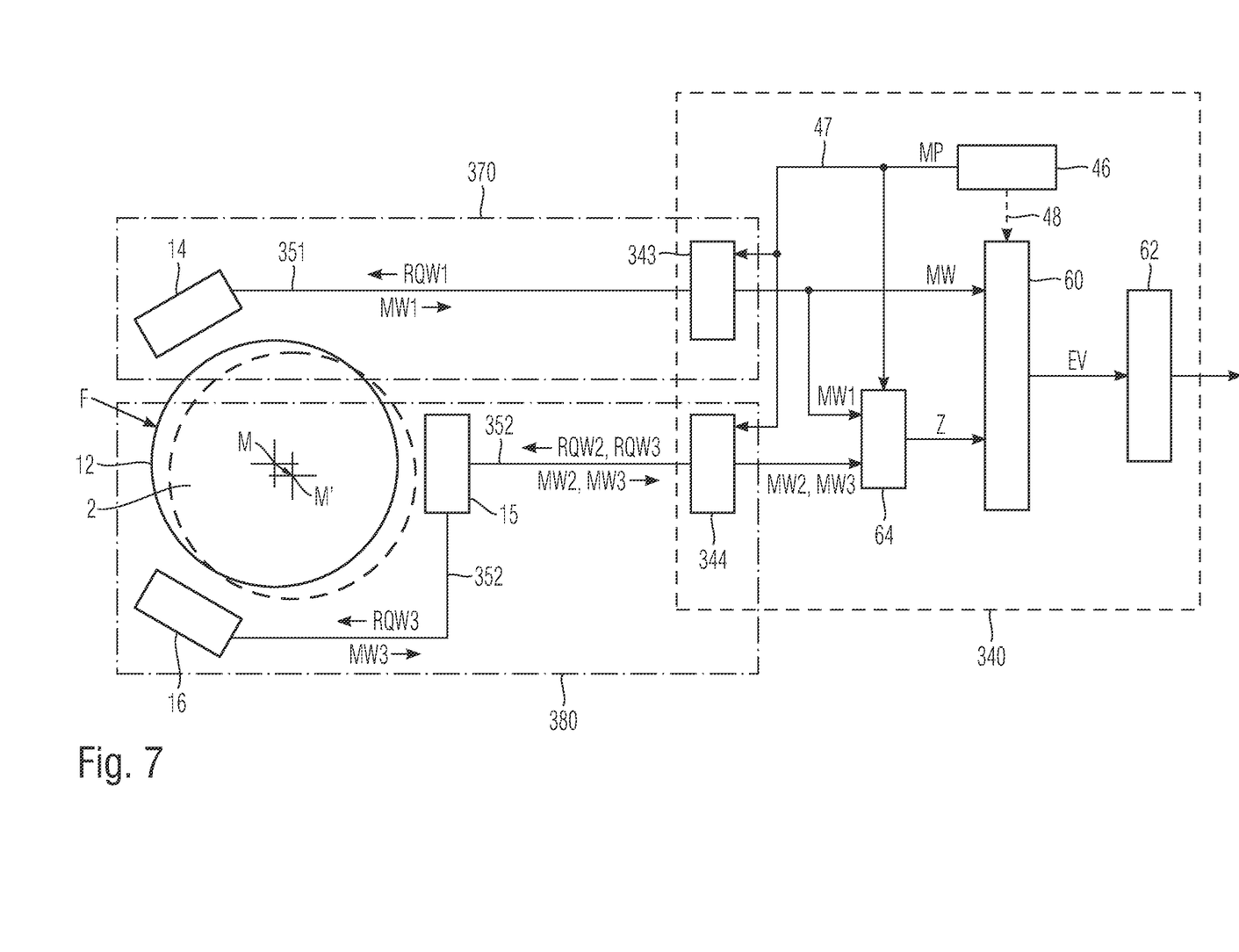
FIG. 7 schematically illustrates a device according to an example embodiment of the present invention.

FIG. 7 schematically illustrates the basic structure of multi-position measuring device 8, which includes a measuring graduation 12 and three scanning heads, 14, 15, 16.

Measuring graduation 12 is arranged in annular form across the circumference of shaft 2 and is connected to shaft 2 in a torsionally fixed manner. Measuring graduation 12 may be mounted directly on shaft 2, for example, in the form of a sequence of magnetic regions. As an alternative, measuring graduation 12 is arranged on a graduation carrier, which in turn is connected to shaft 2. When shaft 2 rotates, measuring graduation 12 moves past measuring heads 14, 15, 16.

Scanning heads 14, 15, 16 are mounted in a static fashion in relation to shaft 2, for example, by being connected to a housing of motor spindle 10. A substantially annular carrier element, which encloses shaft 2, may be provided as a carrier for scanning heads 14, 15, 16. Scanning heads 14, 15, 16 are, for example, distributed at regular angular intervals across the circumference of shaft 2 so that an ideal, but not necessarily mandatory, angle interval of 120° results in the case of three scanning heads 14, 15, 16.

In a simpler variant, it is also possible to use only two measuring heads, in which case an angle interval of 180°, for example, may be provided.

Scanning heads 14, 15, 16 are adapted to scan measuring graduation 12 and to obtain position-dependent signals therefrom, on which the angular position of shaft 2 is able to be determined. Different physical scanning principles may be used, such as magnetic, optical, or inductive scanning principles.

In the illustrated example, scanning heads 14, 15, 16 in conjunction with measuring graduation 12 are arranged as absolute measuring devices, e.g., digital angle values MW1, MW2, MW3 result from the scanning of measuring graduation 12 with the aid of scanning heads 14, 15, 16.

In an ideal system and with a perfect round concentricity of shaft 2, scanning heads 14, 15, 16 measure the same angular position, or the measured angle values MW2, MW3 of scanning heads 15, 16 have a constant offset of 120° or 240° in relation to angle value MW1 of first scanning head 14.

In a real operation, however, for example, when milling workpiece 6 using motor spindle 10, forces act on shaft 2 in a radial direction and deflect it in relation to stationary scanning heads 14, 15, 16; FIG. 7 illustrates, as a substitute for the complex force characteristic that results during the machining process with a rotating shaft 2, a force vector F, which is only symbolically indicated and which shifts shaft 2 with center of rotation M out of the ideal position into the working position, indicated by dashed lines, having a center of rotation M'. Because this in turn has an effect on measured angle values MW1, MW2, MW3, the evaluation of the deviations of angle values MW1, MW2, MW3 resulting from the deflection of shaft 2 allows conclusions to be drawn about the occurring forces or the dynamic force characteristic. In particular, a characteristic of the shifting of shaft 2 is able to be calculated from the characteristic of angle values MW1, MW2, MW3.

The measuring system illustrated in FIG. 7 has two measuring systems 370, 380. Measuring system 370 includes first scanning head 14, which is connected via a data transmission channel 351 to a data interface 343. To initiate a measurement, data interface 343 sends a request command RQW1 to scanning head 14, which performs a measurement and transmits angle value MW1 to data interface 343. As in the previous examples, a measuring process is triggered by a measuring pulse MP, which sequencing control 46 conveys to measuring system 370.

Measuring system 380 includes second scanning head 15 and third scanning head 16, both of which are connected via a data transmission channel 352 to a bus interface 344. Bus interface 344 is able to communicate with both scanning heads 15, 16 so that it transmits a first request command RQW2 to scanning head 15 and a second request command RQW3 to scanning head 16 for the initiation of a measurement. Alternatively, a shared request command may be provided for initiating the measurements, which is transmitted to both scanning heads 15, 16, e.g., broadcast.

Thus, a bus interface 344 is able to be employed as soon as at least two digital measuring devices, in this example scanning heads 15, 16, are to be connected. Scanning heads 15, 16 in turn transmit measured angle values MW2, MW3 back to bus interface 344. In contrast to the measuring systems described above, measuring system 380 is thus adapted to measure and output two measured values, specifically two angle values MW2, MW3.

Data interface 343 and bus interface 344 are arranged in a control unit 340. In addition, control unit 340 includes sequencing control 46, data converter 60, and output interface 62, which are described above in connection with FIG. 2, and also a processing unit 64.

In this exemplary embodiment, angle values MW1, MW2, MW3 measured by measuring systems 370, 380 are not directly conveyed to data converter 60 but are conveyed to processing unit 64. Processing unit 64 calculates intermediate values Z, which indicate the characteristic of the deflection of shaft 2, from the characteristic of angle values MW1, MW2, MW3.

In the same manner as the measurement of angle values MW1, MW2, MW3, the calculation of intermediate values Z takes place in the time period of measuring pulses MP. This results in a series of intermediate values conveyed as measured values to data converter 60, which converts the intermediate values into angle-based shifting result values EV, i.e., reduces them to a shifting result value EV per sector SEC.

In this exemplary embodiment, angle value MW1 measured by scanning head 14 is conveyed to data converter 60 as reference angle value MW, which is utilized for determining the respective current sector SEC. This is advantageous in those instances in which the measuring error during the measurement of angle value MW1 resulting from shifting of shaft 2 is tolerable for the further evaluation.

Figure 8:
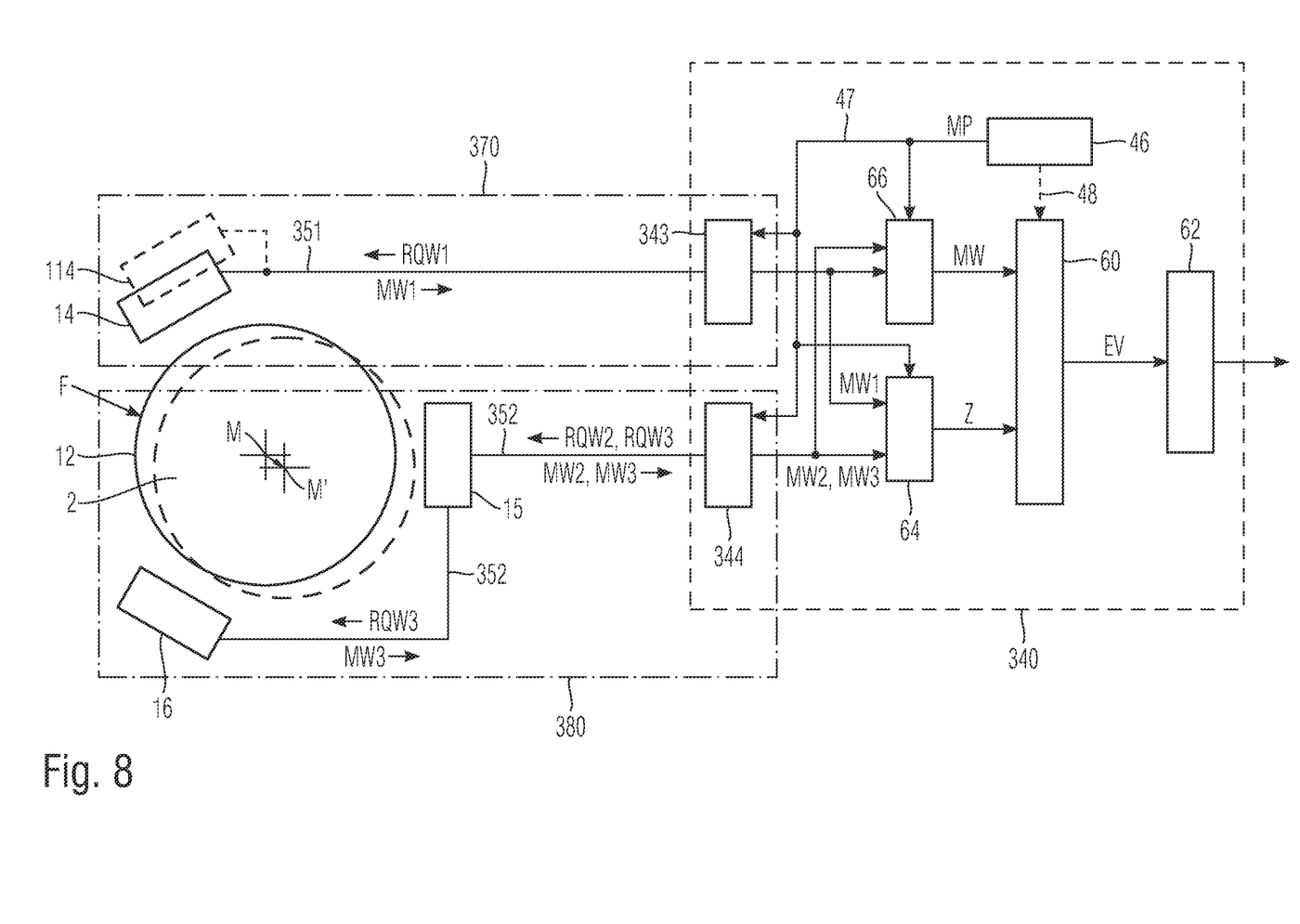
FIG. 8 schematically illustrates a device according to an example embodiment of the present invention.

FIG. 8 schematically illustrates a further variant of a measuring system, which differs from the measuring system illustrated in FIG. 7 in the formation of reference angle value MW. For this purpose, a second processing unit 66, to which angle values MW1, MW2, MW3 are conveyed, is provided in control unit 340. Second processing unit 66 calculates, for example, by averaging, from angle values MW1, MW2, MW3 as an intermediate value a corrected angle value MW, which again serves as a reference angle value in the data converter. In this manner, the determination of current sector SEC in the data converter becomes independent of the shifting of the shaft so that an even greater accuracy of the result values is achieved.

When calculating reference angle value MW, it is necessary to consider the offset of 120° or 240° between angle values MW1, MW2, MW3 caused by the placement of scanning heads 14, 15, 16.

As indicated by dashed lines in FIG. 8, the multi-position measuring device may have still further scanning heads, e.g., a fourth scanning head 114. The further scanning heads are able to measure shifting of the shaft or measuring graduation 12 perpendicular to the drawing plane, provided measuring graduation 12 has graduation structures that allow for a measurement in this measuring direction. The measured values of the further scanning heads are able to be directly conveyed to the data converter to be converted into angle-based result values, but they may also be conveyed to processing units 64, 66 in order to be taken into account in the calculation of intermediate values Z and/or reference angle value MW.

The communication with the further scanning heads may be carried out via a bus connection (e.g., data interface 343 may be implemented as a bus interface) or via separate data interfaces.

Alternatively, each measuring head 14, 15, 16 may also be adapted to measure both angle values and shifting perpendicular to the drawing plane.

Measuring heads 14, 15, 16 in conjunction with, e.g., absolutely encoded, measuring graduation 12 form absolute, e.g., digital, measuring devices. An incremental measuring graduation may be used as an alternative so that, in conjunction with suitable measuring heads for evaluating incremental signals, an incremental rotary encoder is able to be produced. In a further refinement, three measuring systems that correspond to the examples illustrated in FIGS. 6A and 6B result when using processing interfaces in place of data interface 343 or bus interface 344.

It should be understood that the devices and methods described herein are not restricted to use in connection with machine tools for processing by milling. Instead, the devices and methods described herein may be used in any machine and system in which the effects of a rotating shaft on various components of the machine or system to be checked are meant to be analyzed. In addition to milling machines, it is also possible to utilize the devices and methods hereof in connection with grinding machines, turning machines, conveyer systems, etc.

What is claimed is:

1. A device for processing rotation-dependent measured values, comprising:
   a data converter;
   a sequencing control; and
   an output interface;
   wherein the data converter is adapted to receive, at constant time intervals of a measuring interval, series of measured values that are a function of rotation of a shaft, at least one measured value including an angle value that indicates an angular position of the shaft;
   wherein the data converter is adapted to,
      subdivide a rotation of the shaft into a plurality of sectors, each sector having an equal angular range,
      for each of at least one of the sectors, allocate a plurality of received measured values to a sector using an angle value as a reference angle value, and,
      per rotation of the shaft, determine, from the allocated plurality of received measured values, for each series of measured values, exactly one result value representative of the plurality of received measured values for the sector; and
   wherein the data converter is adapted to output the result values to the output interface.

2. The device according to claim 1, further comprising at least one measuring system including an interface, a transmission channel, and a measuring device, the measuring system adapted to generate and output at least one measured value in response to arrival of a measuring pulse supplied to the measuring system in the time intervals of the measuring interval.

3. The device according to claim 2, wherein the measuring system is adapted to output at least one measured value to the data converter.

4. The device according to claim 2, wherein the measuring system is adapted to output at least one measured value to a processing unit, the processing unit being adapted to calculate, from the measured value, an intermediate value and to output the intermediate value to the data converter.

5. The device according to claim 2, wherein at least one measuring system includes a data interface connected via a data transmission channel to a digital measuring device.

6. The device according to claim 2, wherein at least one measuring system includes a processing interface connected via a signal transmission channel to an incremental encoder and/or an analog sensor.

7. The device according to claim 2, wherein at least one measuring system includes a bus interface connected via a data transmission channel to at least two digital measuring devices.

8. The device according to claim 2, wherein the sequencing control is adapted to generate the measuring pulse and to supply the measuring pulse to the measuring system.

9. The device according to claim 1, wherein the measured values include time-based measured values.

10. The device according to claim 1, wherein an angular range of each of the plurality of sectors equals 360°/n, n representing a total number of the sectors in one complete revolution of the shaft.

11. The device according to claim 1, wherein a plurality of sectors has a plurality of allocated received measured values, and the data converter is adapted to determine, from the allocated received measured values, for each series of measured values, exactly one result value for each of the plurality of sectors.

12. The device according to claim 1, wherein each sector has a plurality of allocated received measured values, and the data converter is adapted to determine, from the allocated received measured values, for each series of measured values, exactly one result value for each of the sectors.

13. A device for processing rotation-dependent measured values, comprising:
   a data converter adapted to receive, at constant time intervals of a measuring interval, series of measured values that are a function of rotation of a shaft, at least one measured value including an angle value that indicates an angular position of the shaft;
   wherein the data converter is adapted to,
      subdivide a rotation of the shaft into a plurality of sectors, each sector having an equal angular range,
      for each of at least one of the sectors, allocate a plurality of received measured values to a sector using an angle value as a reference angle value, and,
      per rotation of the shaft, determine, from the allocated plurality of received measured values, for each series of measured values, exactly one result value representative of the plurality of received measured values for the sector; and
   wherein the data converter is adapted to output the result values to an output interface.

14. The device according to claim 13, wherein an angular range of each of the plurality of sectors equals 360°/n, n representing a total number of the sectors in one complete revolution of the shaft.

15. The device according to claim 13, wherein a plurality of sectors has a plurality of allocated received measured values, and the data converter is adapted to determine, from the allocated received measured values, for each series of measured values, exactly one result value for each of the plurality of sectors.

16. The device according to claim 13, wherein each sector has a plurality of allocated received measured values, and the data converter is adapted to determine, from the allocated received measured values, for each series of measured values, exactly one result value for each of the sectors.

17. A method for processing rotation-dependent measured values utilizing a device that includes a data converter, a sequencing control, and an output interface, comprising:
   conveying, to the data converter at constant time intervals of a measuring interval, series of measured values that are a function of rotation of a shaft, at least one measured value including an angle value that indicates an angular position of the shaft;
   subdividing, in the data converter, a rotation of the shaft into a plurality of sectors;
   for each of at least one of the sectors,
      allocating, by the data converter, a plurality of received measured values to a sector using an angle value as a reference angle value; and
      determining, by the data converter, per rotation of the shaft, from the allocated plurality of received measured values, for each series of measured values, exactly one result value representative of the plurality of received measured values for the sector; and outputting the result values to the output interface.

18. The method according to claim 17, wherein the device includes at least one measuring system having an interface, a transmission channel, and a measuring device, the method further comprising:

conveying measuring pulses to the measuring system at the time intervals of the measuring interval; and in response to an arrival of a measuring pulse at the measuring system, generating and outputting, by the measuring system, at least one measured value.

19. The method according to claim 18, wherein the measuring system outputs at least one measured value to the data converter.

20. The method according to claim 18, wherein the measuring system outputs at least one measured value to a processing unit, and the processing unit calculates, from the at least one measured value, an intermediate value and outputs the intermediate value to the data converter.

21. The method according to claim 18, wherein at least one measuring system includes a data interface connected via a data transmission channel to a digital measuring device.

22. The method according to claim 18, wherein at least one measuring system includes a processing interface connected via a signal transmission channel to an incremental encoder and/or an analog sensor.

23. The method according to claim 18, wherein at least one measuring system includes a bus interface connected via a data transmission channel to at least two digital measuring devices.

24. The method according to claim 18, further comprising:

generating the measuring pulses by the sequencing control; and supplying the measuring pulses by the sequencing control to the measuring system.

25. The method according to claim 17, wherein the allocating of the measured values includes:

selecting, as the result value, a first measured value after, or a last measured value before, a sector change;

forming, as the result value, an average value of all measured values within a sector; and/or calculating, as the result value, a virtual measured value in relation to an angular position in a center of a current sector from at least two measured values within the current sector.

26. The method according to claim 17, wherein the measured values include time-based measured values.

27. The method according to claim 17, wherein an angular range of each of the plurality of sectors equals 360°/n, n representing a total number of the sectors in one complete revolution of the shaft.

28. The method according to claim 17, wherein a plurality of sectors has a plurality of allocated received measured values, and the determining includes determining, by the data converter, from the allocated received measured values, for each series of measured values, exactly one result value for each of the plurality of sectors.

29. The method according to claim 17, wherein each sector has a plurality of allocated received measured values, and the determining includes determining, by the data converter, from the allocated received measured values, for each series of measured values, exactly one result value for each of the sectors.

* * * * *